United States Patent Office 2,988,564
Patented June 13, 1961

2,988,564
SUBSTITUTED DICYCLOPENTADIENYLIRON COMPOUNDS CONTAINING AT LEAST ONE CYANO, FORMYL OXIME OR FORMYL OXIME LOWER ALKANOATE GROUP, AND THEIR PREPARATION
Peter J. Graham, McDaniel Crest, Del., assignor to E. I. du Pont de Nemours and Company, Wilmington, Del., a corporation of Delaware
No Drawing. Filed Mar. 31, 1954, Ser. No. 420,207
16 Claims. (Cl. 260—439)

This invention relates to a new class of stable organometallic compounds and more particularly to the cyano derivatives of organometallic iron compounds.

Organometallic compounds in which the metal is directly linked to one or more organic radicals through carbon thereof are of interest not only from a theoretical standpoint but also because of many practical applications. Thus, tetraethyllead is widely used as an antiknock agent for internal combustion engines and many mercury compounds have found use in the fungicide and/or the pesticide art. Many organometallic derivatives of the elements of groups I and II of the periodic table have found fundamental use in chemical syntheses, both as reactants and catalysts. Until quite recently, however, no stable organometallic iron compound was apparently known.

Dicyclopentadienyliron has been prepared (see Kealy and Pauson, Nature, 168, 1039 (1951) and the copending application of Pauson, Ser. No. 291,567, filed June 5, 1952), now U.S. Patent 2,680,765, issued June 8, 1954, as have also some derivatives of this interesting organoiron compound, for instance, certain diacyl derivatives and the dicarboxylic acid (see Woodward et al., J. Am. Chem. Soc. 74, 3458 (1952)). Still other derivatives have also been prepared and form the subject of the copending applications of Weinmayr, for instance, the monoacyl derivatives, application Ser. No. 312,852, now abandoned filed October 2, 1952, and the monocarboxylic acid, application Ser. No. 312,853, filed October 2, 1952, now U.S. Patent 2,683,157, issued July 6, 1954. These various compounds are of particular utility in many fields, such as antiknock agents, fungicides and pesticides and as intermediates to still other interesting and desirable organometallic compounds.

This invention has as an object a new class of organoiron compounds. A further object is the provision of new tinting materials for plastics and new intermediates for dyes. Other objects will appear hereinafter.

These objects are accomplished by the present invention of organoiron compounds which have at least one cyano group directly bonded to nuclear carbon of at least one of the cyclopentadienyl nuclei of a dicyclopentadienyliron. A further aspect of the present invention is the process whereby these cyanobis(cyclopentadienylirons) are obtained in which process there are decomposed the carboxylates of the oximes of aldehyde derivatives of dicyclopentadienyliron.

The following examples in which parts are by weight are illustrative of the invention.

EXAMPLE I

A. Preparation of aldehyde derivative of dicyclopentadienyliron

A mixture of 18.6 parts of dicyclopentadienyliron, 30.5 parts (2 molar proportions based on the dicyclopentadienyliron) of phosphorus oxychloride and 27 parts (2 molar proportions based on the dicyclopentadienyliron) of N-methylformanilide was heated to 50° C. and maintained in the range 50–55° C. over a period of 1.5 hours. The reaction mixture was then allowed to stand at room temperature under anhydrous conditions for 15 hours and finally reheated again to 55–60° C. for 30 minutes. During this over-all reaction cycle, hydrogen chloride was evolved and the reaction mixture darkened considerably and became more viscous. After cooling to room temperature, the resulting viscous reaction mixture was poured directly onto an excess of ice and the resulting aqueous mixture extracted thoroughly with a total of about 420 parts of diethyl ether in several successive portions. The combined ether extracts were washed to neutrality with distilled water and dried over anhydrous magnesium sulfate. The anhydrous diethyl ether extract was concentrated by heating at steam bath temperatures and the remaining dark, oily residue cooled in an ice/water bath. The resultant red-brown crystalline product was removed by filtration. There was thus obtained about 11 parts of crude crystalline cyclopentadienyl(aldomethylcyclopentadienyl)iron and approximately an equal amount of the oil-crude bis(aldomethylcyclopentadienyl)iron. The monoaldomethyl derivative was recrystallized from a mixture of anhydrous n-heptane and anhydrous methylene chloride. The pure crystalline cyclopentadienyl(aldomethylcyclopentadienyl)iron became isotropic at 45° C. and gave a clear fluid melt at 124.5° C.

B. Preparation of oxime

A solution of 21.4 parts (0.1 mole) of the monoaldehyde derivative of dicyclopentadienyliron in 120 parts of methanol was mixed with a solution of 6.9 parts of hydroxylamine hydrochloride in 20 parts of water and treated slowly with a solution of 5.30 parts of sodium carbonate in 30 parts of water. The reaction mixture was stirred at 30° C. for 30 minutes after which the mixture was allowed to stand overnight. The solid that separated was filtered, washed with a little aqueous methanol and air-dried. This fraction amounted to 17.7 parts after vacuum drying and had a melting point of 128–133° C. (anti-oxime isomeric form). The addition of water to the first filtrate precipitated the remaining isomeric form of the product which, after cooling, filtering, washing and drying, amounted to 3.5 parts and had a melting point of 89–91° C. A sample of the first oxime isomer, when purified from a mixture of benzene and heptane, melted at 133–135° C. and appeared to have a transition temperature at 98° C.

Analysis.—Calculated for $C_{11}H_{11}FeNO$: C, 57.65%; H, 4.84%; Fe, 24.37%; N, 6.11%. Found: C, 57.79%, 57.93%; H, 5.08%, 5.10%; Fe, 24.41%, 24.44%; N, 6.37%.

C. Preparation of oxime acetate

A mixture containing 20 parts of the antioxime of cyclopentadienyl(aldomethylocyclopentadienyl)iron and 40 parts of acetic anhydride was prepared at room temperature. A deep red-brown solution resulted and the heat of reaction raised the temperature to 45° C. After about 30 minutes, the reaction had cooled to room temperature and the mixture was poured into about 200 parts of ice. When all the ice had melted, 10 parts of sodium carbonate was added and the red-orange coil that separated was extracted with methylene-chloride. The combined extracts were washed with 100 parts of 5% aqueous sodium carbonate solution followed by three washings with distilled water. The methylene chloride solution was dried over magnesium sulfate, filtered and the solvent evaporated at room temperature under a stream of nitrogen. This gave a viscous red oil that decomposed slowly on standing at room temperature. The odor of acetic acid indicated that an oxime acetate had been isolated and that it was undergoing slow decomposition at room temperature. A sample of the viscous red oil before decomposition had the correct iron analysis for the oxime acetate.

*Analysis.*—Calculated for $C_{13}H_{13}FeNO_2$: Fe, 20.60%. Found: Fe, 20.75%.

D. *Preparation of cyclopentadienyl(cyanocyclopentadienyl)iron.*

The viscous red oily oxime acetate was then placed in a vacuum desiccator over phosphorus pentoxide and the acetic acid which was formed by decomposition of the oxime acetate removed by vacuum pump. After several days, the oil solidified. It was then transferred to a vacuum sublimer and vacuum sublimation was conducted at 100° C. and 1 mm. pressure for several days until no more brown sublimate was obtained. The total yield of crude product was 10 parts. This was recrystallized from 90 parts of n-heptane from which was isolated 8.5 parts (46% yield) of cyclopentadienyl(cyanocyclopentadienyl)iron, M.P. 103–104° C.

*Analysis.*—Calculated for $C_{11}H_9FeN$: C, 62.60%; H, 4.30%; Fe, 26.46%; N, 6.64%. Found: C, 62.61%, 62.50%; H, 4.61%, 4.68%; Fe, 26.71%, 26.82%; N, 6.64%, 6.56%.

The present invention is generic to organoiron compounds having the iron atom attached to two cyclopentadienyl nuclei, preferably cyclopentadienyl radicals, on at least one of said nuclei there being at least one cyano group. Those compounds hydrocarbon except for iron and cyano nitrogen are preferred, i.e., the cyclopentadienyl nuclei are unsubstituted or have only hydrocarbon substituents.

The carboxaldehyde derivatives of dicyclopentadienyliron, as illustrated above, are prepared directly from the corresponding dicyclopentadienyliron compound and essentially equimolar portions of a phosphorus oxyhalide, e.g., phosphorus oxychloride, and a tertiary formamide. An equimolar proportion of both the phosphorus oxyhalide and the tertiary formamide being used are required for each carboxaldehyde substituent it is desired to introduce into the dicyclopentadienyliron structure. The preparation of these compounds is further described in my copending application Ser. No. 360,370, and now U.S. Patent 2,849,469, filed June 8, 1953. As disclosed therein the carboxaldehyde derivatives of dicyclopentadienyliron have directly bonded to nuclear carbon of at least one cyclopentadienyl nuclei at least one carboxaldehyde, i.e., aldomethyl, i.e., formyl, —CHO, group. It is noted in my copending application that other methods of naming the aldomethyl or carboxaldehyde derivatives of dicyclopentadienyliron exist and might be more clear to those skilled in the chemical art. For instance, cyclopentadienyl(aldomethylcyclopentadienyl)iron might well also be termed cyclopentadienyl(formylcyclopentadienyl)iron.

The production of the oximes of the carboxaldehyde, i.e., formyl oxime, —CH=NOH, derivatives of dicyclopentadienyliron follows the general procedure employed for the production of oximes. This involves reaction generally at 15–50° C. of a slight excess of hydroxylamine with the aldehyde.

For the preparation of the corresponding cyano derivatives, the oxime is converted to a carboxylic ester derivative, preferably a lower (1–4 carbon) alkanoate, e.g., its formate, acetate, propionate, or butyrate, followed by decomposition of the ester. The ester is readily prepared by the reaction of an acylating agent, such as an anhydride, with the oxime. Thus, these preferred ester derivatives contain attached to nuclear carbon of a cyclopentadienyl ring the formyl oxime lower alkanoate group, i.e.,

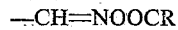
—CH=NOOCR wherein R is a lower alkyl group.

Any carboxylate of an oxime of an organoiron compound having two cyclopentadienyl nuclei attached to the iron and having on at least one of said nuclei at least one carboxaldehyde grouping may be employed in the process of this invention wherein such oxime carboxylate is decomposed by exposing the same to a temperature of 0–100° C. It is preferred to carry out the decomposition at 20–50° C. to produce high yields of the desired cyano derivative.

The cyanodicyclopentadienyliron compounds of this invention can be purified by conventional crystallization from such solvents as hydrocarbons and chlorinated hydrocarbons. The compounds can conveniently be purified by sublimation onto a cold surface at elevated temperatures under reduced pressures. Generally, the sublimation purification is carried out in the range of 50–100° C. using a water-cooled condensation surface and operating at pressures in the range of 0.1 to 1.0 mm. of mercury.

In addition to dicyclopentadienyliron itself as specifically illustrated in the foregoing, there can be used in the preparation of these new cyano derivatives of dicyclopentadienyliron the nuclear (i.e., on the cyclopentadiene nuclei) substituted derivatives of dicyclopentadienyliron, such as those wherein one or both of the cyclopentadienyl nuclei carry one or more saturated aliphatic, araliphatic, alkaromatic, aromatic, or saturated cycloaliphatic substituents. Suitable specific examples of these include cyclopentadienyl(ethylcyclopentadienyl)iron, bis(methylcyclopentadienyl)iron, cyclopentadienyl(phenylcyclopentadienyl)iron, bis(phenylcyclopentadienyl)iron, cyclopentadienyl(cyclohexylcyclopentadienyl)iron, and the like. From these specific dicyclopentadienyliron derivatives there can be prepared, using the method illustrated, the corresponding cyanosubstituted derivatives such as cyclopentadienyl(cyanoethylcyclopentadienyl)iron, bis(cyanomethylcyclopentadienyl)iron, cyclopentadienyl(cyanophenylcyclopentadienyl)iron, bis(cyanophenylcyclopentadienyl)iron, cyclopentadienyl(cyanocyclohexylcyclopentadienyl)iron, and the like.

Thus, this invention is generic to the cyano derivatives of dicyclopentadienyliron and the nuclear substituted derivatives thereof, preferably wherein the one or more substituents on either or both of the cyclopentadienyl nuclei are solely hydrocarbon, free of non-aromatic unsaturation and generally of no more than seven carbons each, wherein the said cyclopentadienyl nuclei carry at least one cyano, i.e., —CN, group directly bonded to at least one of the nuclear carbons of at least one of the said cyclopentadienyliron rings. It is to be noted that as a necessary and sufficient condition, the starting cyclopentadienyliron derivative must have at least one hydrogen-bearing nuclear carbon in at least one of the cyclopentadienyl rings.

These new cyanodicyclopentadienyliron compounds are colored crystalline solids, exhibiting ultraviolet and visible spectra containing characteristic absorption peaks for the dicyclopentadienyliron structure as well as the cyano group. These new compounds are soluble in a wide range of organic solvents. The cyanodicyclopentadienyliron compounds in themselves are useful as anti-knock agents, driers for drying oils, catalysts in the oxidation of asphalt, pesticides, fungicides, and the like. They may be incorporated in clear colorless plastics to give tinted plastics useful in filtering out certain portions of the visible spectrum. In their utility as intermediates, they are useful in the preparation of new and interesting organic dyestuffs.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Cyclopentadienyl(cyanocyclopentadienyl)iron.

2. A cyano substituted dicyclopentadienyliron compound wherein the iron atom is attached to two cyclopentadienyl nuclei, at least one of which carries a cyano group directly bonded to nuclear carbon thereof, and each of said cyclopentadienyl nuclei has as the sole substituent other than said iron atom no more than one cyano group.

3. A cyano substituted dicyclopentadienyliron compound wherein the iron atom is attached to two cyclopentadienyl nuclei, at least one of which carries a cyano group directly bonded to nuclear carbon thereof, and each of said cyclopentadienyl nuclei has as the sole substituents other than said iron atom no more than one cyano group and no more than one monovalent hydrocarbon radical free selected from the class consisting of aromatic, saturated aliphatic, and saturated cycloaliphatic hydrocarbon radicals, each of no more than 7 carbon atoms.

4. The oxime of cyclopentadienyl(formylcyclopentadienyl)iron.

5. A substituted dicyclopentadienyliron compound wherein the iron atom is attached to two cyclopentadienyl nuclei, at least one of which carries a formyl oxime group directly bonded to nuclear carbon thereof, and each of said cyclopentadienyl nuclei has as the sole substituent other than said iron atom no more than one formyl oxime group.

6. A substituted dicyclopentadienyliron compound wherein the iron atom is attached to two cyclopentadienyl nuclei, at least one of which carries a formyl oxime group directly bonded to nuclear carbon thereof, and each of said cyclopentadienyl nuclei has as the sole substituents other than said iron atom no more than one formyl oxime group and no more than one monovalent hydrocarbon radical selected from the class consisting of aromatic, saturated aliphatic, and saturated cycloaliphatic hydrocarbon radicals, each of no more than 7 carbon atoms.

7. The oxime acetate of cyclopentadienyl(formyl-cyclopentadienyl)iron.

8. A substituted dicyclopentadienyliron compound wherein the iron atom is attached to two cyclopentadienyl nuclei, at least one of which carries a formyl oxime lower alkanoate group directly bonded to nuclear carbon thereof, and each of said cyclopentadienyl nuclei has as the sole substituent other than said iron atom no more than one formyl oxime lower alkanoate group.

9. A substituted dicyclopentadienyliron compound wherein the iron atom is attached to two cyclopentadienyl nuclei, at least one of which carries a formyl oxime lower alkanoate group directly bonded to nuclear carbon thereof, and each of said cyclopentadienyl nuclei has as the sole substituents other than said iron atom no more than one formyl oxime lower alkanoate group and no more than one monovalent hydrocarbon radical selected from the class consisting of aromatic, saturated aliphatic, and saturated cycloaliphatic hydrocarbon radicals, each of no more than 7 carbon atoms.

10. Process which comprises contacting and reacting hydroxylamine with cyclopentadienyl(formylcyclopentadienyl)iron at a temperature of 15 to 50° C., contacting and reacting the resulting oxime with acetic anhydride, subjecting the resulting oxime acetate to a temperature of 20 to 100° C., and separating the resultant cyclopentadienyl(cyanocyclopentadienyl)iron.

11. Process which comprises contacting and reacting, at a temperature of 15 to 50° C., hydroxylamine with a substituted dicyclopentadienyliron containing on at least one of the cyclopentadienyl nuclei a formyl group and as sole substituents on each of said cyclopentadienyl nuclei no more than one formyl group and no more than one monovalent hydrocarbon radical selected from the class consisting of aromatic, saturated aliphatic, and saturated cycloaliphatic hydrocarbon radicals, each of no more than 7 carbon atoms, contacting and reacting the resulting oxime with an anhydride of a lower alkanoic acid, subjecting the resulting oxime alkanoate to a temperature of 20 to 100° C., and separating the resultant cyano substituted dicyclopentadienyliron.

12. Process which comprises contacting and reacting the oxime of cyclopentadienyl(formylcyclopentadienyl)-iron with acetic anhydride, subjecting the resulting oxime acetate to a temperature of 20 to 100° C., and separating the resultant cyclopentadienyl(cyanocyclopentadienyl)iron.

13. Process which comprises contacting and reacting an anhydride of a lower alkanoic acid with a substituted dicyclopentadienyliron containing on at least one of the cyclopentadienyl nuclei no more than one formyl oxime group and as the sole substituents other than the iron atom on each of said cyclopentadienyl nuclei no more than one formyl oxime group and no more than one monovalent hydrocarbon radical selected from the class consisting of aromatic, saturated aliphatic, and saturated cycloaliphatic hydrocarbon radicals, each of no more than 7 carbon atoms, subjecting the resulting oxime alkanoate to a temperature of 20 to 100° C. and separating the resultant cyano substituted dicyclopentadienyliron.

14. Process which comprises contacting and reacting an anhydride of a lower alkanoic acid with a substituted dicyclopentadienyliron containing on at least one of the cyclopentadienyl nuclei a formyl oxime group and as the sole substituents other than the iron atom on each of said cyclopentadienyl nuclei no more than one formyl oxime group, subjecting the resulting oxime alkanoate to a temperature of 20 to 100° C., and separating the resultant cyano substituted dicyclopentadienyliron.

15. Process which comprises contacting and reacting the oxime of cyclopentadienyl(formylcyclopentadienyl)-iron with an anhydride of a lower alkanoic acid, subjecting the resulting oxime alkanoate to a temperature of 20 to 100° C. and separating the resultant cyclopentadienyl-(cyanocyclopentadienyl)iron.

16. A substituted dicyclopentadienyliron compound wherein the iron atom is attached to two cyclopentadienyl nuclei, at least one of which carries directly bonded to nuclear carbon thereof a group selected from the class consisting of cyano, formyl oxime, and formyl oxime lower alkanoate groups, and each of said cyclopentadienyl nuclei has as the sole substituents other than said iron atom no more than one of said groups selected from the class consisting of cyano, formyl oxime, and formyl oxime lower alkanoate groups and no more than one monovalent hydrocarbon radical selected from the class consisting of aromatic, saturated aliphatic, and saturated cycloaliphatic hydrocarbon radicals, each of no more than 7 carbon atoms.

References Cited in the file of this patent

Richter's, Organic Chemistry, vol. 1 page 212 (1919).
Chem. Abstracts, vol. 30, page 1784 (1936).
Fieser et al., Organic Chemistry, page 691 (1944).
Richter, Textbook of Organic Chemistry, 3rd Ed., page 106 (1952).
Woodward et al., J.A.C.S., vol. 74, pp. 3458–3459, July 5, 1952.
Jaffe, Jr. Chemical Physics, vol. 21, No. 1, Jan. 1953, pp. 156–7.
Wagner et al., Synthetic Organic Chemistry, pp. 281, 598 (1953).
Moffitt, Journ. Am. Chem. Soc., vol. 76, July 5, 1954, pp. 3386–3392.
Wilkinson et al., Journ. Am. Chem. Soc., vol. 76, Apr. 5, 1954, pp. 1970–1974.
Pauson, Quarterly Reviews, vol. 9 (1955) pp. 391–414 especially 408 et seq.